United States Patent
Onda et al.

(10) Patent No.: US 7,355,669 B2
(45) Date of Patent: Apr. 8, 2008

(54) LIQUID CRYSTAL DISPLAY WITH A CONDUCTIVE COLUMN HAVING A GROUND COLUMN DIRECTLY CONTACTING A FIRST ELECTRODE SURROUNDED BY A SEAL

(75) Inventors: Shinya Onda, Tokyo (JP); Mitsuhiro Sugimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 2 days.

(21) Appl. No.: 10/777,705

(22) Filed: Feb. 13, 2004

(65) Prior Publication Data

US 2004/0183986 A1 Sep. 23, 2004

(30) Foreign Application Priority Data

Mar. 17, 2003 (JP) ............... 2003-071197

(51) Int. Cl.
*G02F 1/1339* (2006.01)
(52) U.S. Cl. ............ 349/156; 349/153; 349/155; 349/190; 349/149
(58) Field of Classification Search ........ 349/153, 349/155, 149–152, 156
See application file for complete search history.

(56) References Cited

U.S. PATENT DOCUMENTS

| | | | | |
|---|---|---|---|---|
| 3,919,452 A | * | 11/1975 | Ettre et al. ............ 428/325 |
| 4,640,583 A | * | 2/1987 | Hoshikawa et al. ........ 349/153 |
| 5,179,460 A | * | 1/1993 | Hinata et al. ............ 349/149 |
| 5,684,555 A | * | 11/1997 | Shiba et al. ............ 349/149 |
| 5,860,212 A | * | 1/1999 | Matsuhira ............ 29/840 |
| 5,929,959 A | * | 7/1999 | Iida et al. ............ 349/154 |
| 5,978,061 A | * | 11/1999 | Miyazaki et al. ........... 349/155 |
| 5,995,188 A | * | 11/1999 | Shimizu et al. ............ 349/147 |
| 6,124,606 A | * | 9/2000 | den Boer et al. ........... 257/291 |
| 6,292,249 B1 | * | 9/2001 | Kane et al. ............. 349/155 |
| 6,392,735 B1 | * | 5/2002 | Tani ......................... 349/156 |
| 6,396,559 B1 | * | 5/2002 | Kishimoto et al. ........ 349/156 |
| 6,671,009 B1 | * | 12/2003 | Hattori et al. ............ 349/33 |
| 6,771,346 B2 | * | 8/2004 | Sugimoto et al. ......... 349/149 |
| 6,930,745 B1 | * | 8/2005 | Miyazaki et al. ........... 349/153 |
| 2002/0024621 A1 | * | 2/2002 | Hirakata et al. ............ 349/34 |
| 2003/0137629 A1 | * | 7/2003 | Ichioka et al. ............ 349/149 |
| 2003/0231276 A1 | * | 12/2003 | Miki et al. ............... 349/149 |

FOREIGN PATENT DOCUMENTS

| | | |
|---|---|---|
| JP | 5-127172 A | 5/1993 |
| JP | 9-73099 A | 3/1997 |
| JP | 3014291 B2 | 12/1999 |
| JP | 2001-5017 A | 1/2001 |
| JP | 2001-100217 A | 4/2001 |

\* cited by examiner

*Primary Examiner*—Andrew Schechter
*Assistant Examiner*—Lucy Chien
(74) *Attorney, Agent, or Firm*—Sughrue Mion, PLLC (57) ABSTRACT

A liquid crystal display is provided including a first substrate, a second substrate, and a liquid crystal retained between the first substrate and the second substrate. The liquid crystal display also comprises at least one first conductive column formed on the first substrate, at least one conductive column contact portion electrically connected the conductive column and formed above the second substrate, and a seal bonding the first substrate and the second substrate by contacting at least one part of the first conductive column except a part of the first conductive column which connects the conductive column contact portion.

22 Claims, 12 Drawing Sheets

Fig. 1(a)

PRIOR ART

Fig. 1(b)

PRIOR ART

LIQUID CRYSTAL DISPLAY WITH A CONDUCTIVE COLUMN HAVING A GROUND COLUMN DIRECTLY CONTACTING A FIRST ELECTRODE SURROUNDED BY A SEAL

BACKGROUND OF THE INVENTION

1. Field of the Invention

The present invention relates to a liquid crystal display and a method for manufacturing the liquid crystal display and, more particularly, to a liquid crystal display with a liability electrical connection from external input terminals on one substrate to electrodes on another substrate and a method for manufacturing the liquid crystal display.

2. Description of the Related Art

Active matrix liquid crystal displays ordinarily have a structure in which a TFT substrate and a counter substrate opposed to the TFT substrate are bonded to each other by a sealing material and a liquid crystal material is enclosed between the TFT substrate and the counter substrate. In order to apply a drive voltage to this liquid crystal material, pixel electrodes and an input terminal portion including input terminals electrically connected to the pixel electrodes are formed on the TFT substrate. A counter electrode (common electrode) is formed on the counter substrate at a position such as to face the pixel electrodes on the TFT substrate. Conventionally, by providing counter electrode terminals in the input terminal portion of the TFT substrate an electrical connection between the counter electrode terminals and the counter electrode on the counter substrate is established.

Figure 1A:
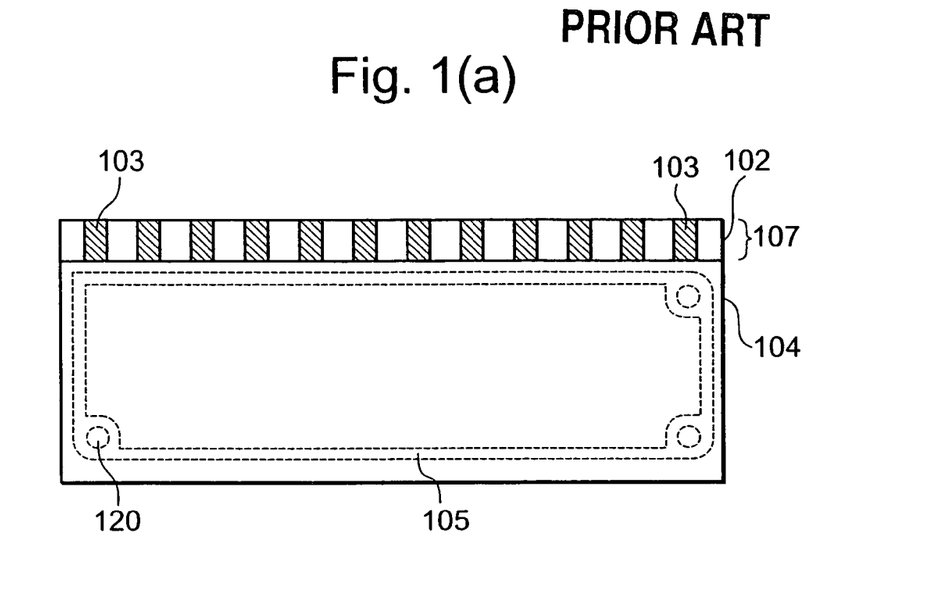
Figure 1B:
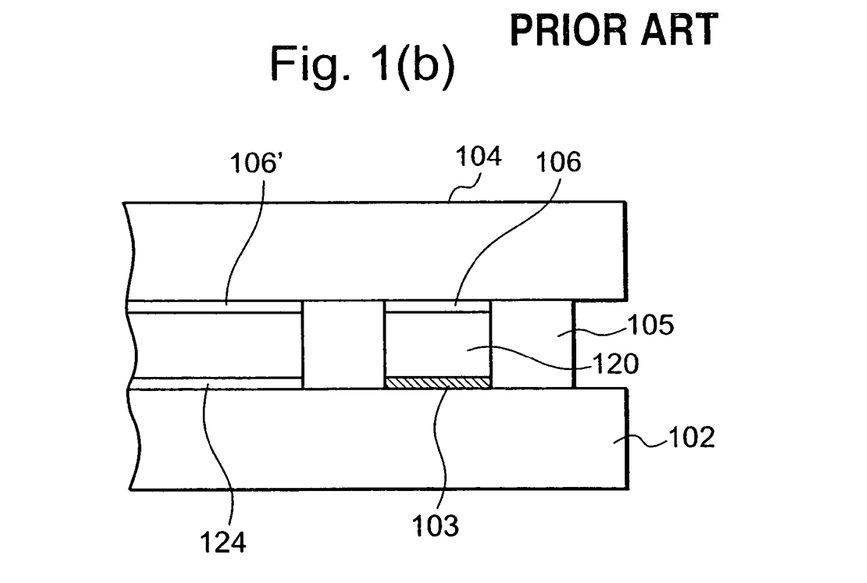

As a first conventional technique, Japanese published application H5-127172A discloses a technique for establishing electrical connection between the counter electrode terminals in the input terminal portion of the TFT substrate and the counter electrode on the counter substrate. FIGS. 1(a) and (b) show the technique in which conductive columns formed mainly of a conductive paste are formed so as to be surrounded by a seal for sealing the two substrates. FIG. 1(a) is a plan view of a liquid crystal display according to this conventional technique, and FIG. 1(b) is a cross-sectional view. Electrodes 103 and 106 are respectively formed on a TFT substrate 102 and a counter substrate 104, and conductive columns 120 formed mainly of a conductive paste are formed between the electrodes 103 and the electrodes 106. The electrodes 103 are counter electrode terminals provided in an input terminal portion 107 of the TFT substrate 102. The electrodes 106 are connected to a counter electrode 106' on the counter substrate 104. The counter electrode terminals in the input terminal portion 107 of the TFT substrate 102 and the counter electrode 106' on the substrate 104 are thereby connected electrically to each other. Further, the conductive columns 120 are surrounded by a seal 105 for bonding together the TFT substrate 102 and the counter substrate 104.

Figure 2:
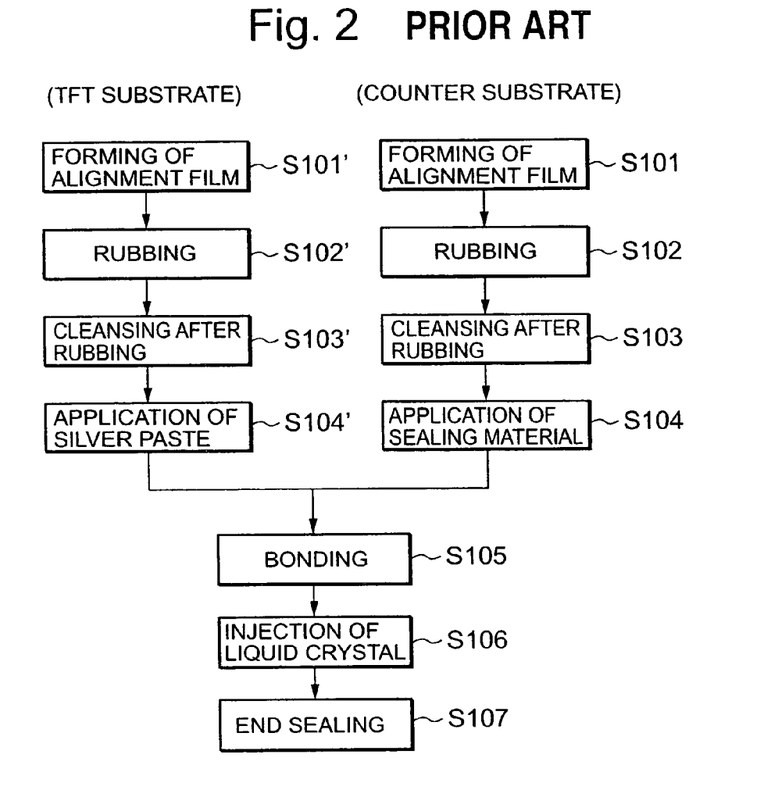
FIG. 2 is a flowchart of a method of manufacturing the liquid crystal display according to the first conventional art.

FIG. 2 is a flowchart of for explaining an example of a process for manufacturing this conventional liquid crystal display. First, an alignment film is formed on the TFT substrate 102 on which electrodes 103 and pixel electrodes 124 are formed and the electrodes 106 and the counter electrode 106' are formed on the counter substrate 104 (steps S101' and S101), followed by rubbing (steps S102' and S102) and cleansing after rubbing (steps S103' and S103). Subsequently, silver paste for forming conductive columns 120 is applied to the electrodes 103 on the TFT substrate 102 (step S104'). On the other hand, sealing material 105 is applied to portions of the substrate 104 other than the portions on which the electrodes 106 and the counter electrode 106' are formed (step S104). Thereafter, the two substrates 102 and 104 are bonded together (step S105), a liquid crystal is injected (step S106), and the liquid crystal injection hole is closed (step S107). The process of manufacturing the liquid crystal display according to this conventional technique is thus performed.

Figure 3:
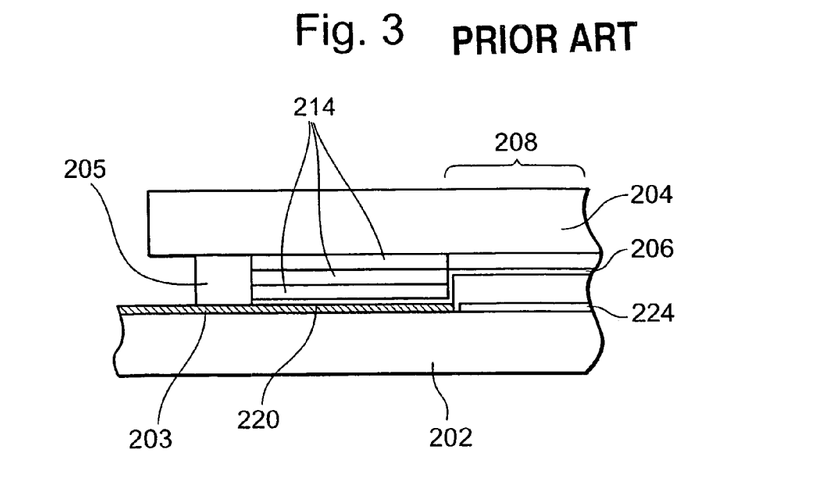
FIG. 3 is a cross-sectional view of the second conventional art.

As a second conventional technique, Japanese published application 2001-5017A discloses a conventional technique for establishing electrical connection between counter electrode terminals and a counter electrode. FIG. 3 shows the technique using conductive columns formed by using color filter materials laminated on the periphery of a display region. FIG. 3 is a cross-sectional view of a portion on the periphery of a display region of a liquid crystal display according to this conventional technique. Columns are formed on a counter substrate 204 by laminating a plurality of color filter materials 214. A counter electrode 206 formed on the counter substrate 204 so as to face pixel electrodes 224 on a TFT substrate 202 extends to the columns and covers the surfaces of the columns. The columns and counter electrode 206 formed on the columns form conductive columns 220. Electrodes 203 are formed on the TFT substrate 202 so as to contact the bottom surfaces of the conductive columns 220. Counter electrode terminals (not shown) connected to the electrodes 203 and the counter electrode 206 are thereby connected electrically to each other. A seal 205 is formed outside the conductive columns 220.

Figure 4:
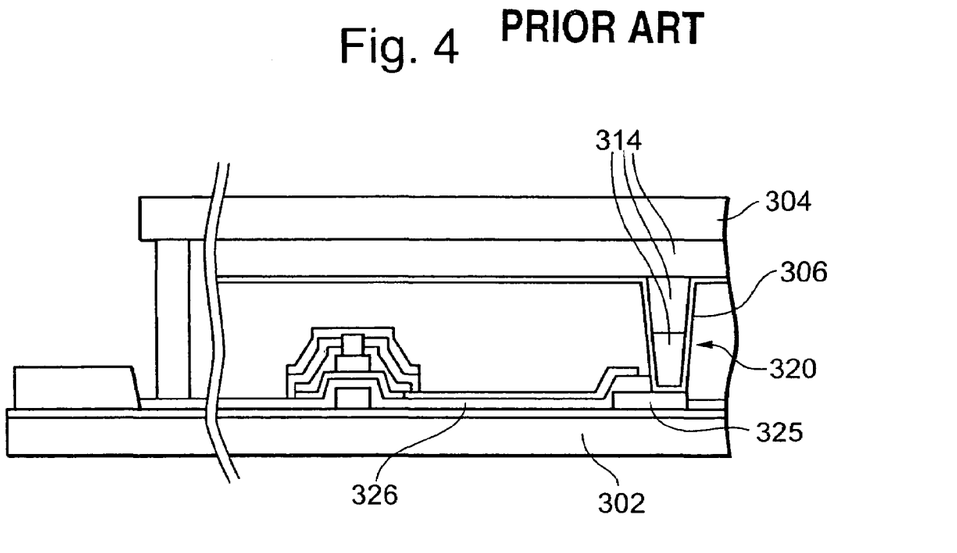
FIG. 4 is a cross-sectional view of the third conventional art.

As a third conventional technique, Japanese Patent No. 3014291 discloses a conventional technique for establishing electrical connection between counter electrode terminals and a counter electrode. The technique uses conductive columns formed by using color filter materials laminated in a display region of a liquid crystal display. FIG. 4 is a cross-sectional view of a portion on the periphery of a display region of a liquid crystal display according to this conventional technique. Columns are formed on a counter substrate 304 by laminating a plurality of color filter materials 314. A counter electrode 306 is formed so as to cover the columns. The columns and the portions of the counter electrode covering the columns form conductive columns 320. The conductive columns 320 are in contact with accumulating capacitor lines 325 on a TFT substrate 302. The accumulating capacitor lines 325 are connected to counter electrode terminals (not shown) to establish electrical connection between the counter electrode terminals and the counter electrode 306.

However, in the first conventional technique, since a material having silver paste as a main constituent is used for the conductive columns 120, one step of applying silver paste to one of the TFT substrate and the counter substrate is required for electrical connection between the TFT substrate and the counter substrate, as shown in the flowchart of FIG. 2. Application of silver paste is performed by dotting silver paste on the substrate by a dispenser method. In this method, since the amount of silver paste applied from a dispenser varies, it is necessary to increase the amount of applied paste in order to stabilize the electrical connection and, therefore, there is a problem that the application area is increased. Further, in the case of multiple patterning for forming a plurality of small liquid crystal displays on a large substrate, the number of silver paste dots is increased in proportion to the number of liquid crystal displays formed on the substrate and there is a problem that the process time is increased and the throughput is reduced. Further, there is also a problem that a foreign material may attach to the silver paste or that silver paste may be sputtered to portions other than the application area by the operation of the dispenser to cause a display fault. Further because of large variations in application pressure the amount of application can not be uniformly maintained and the stability of electrical connection between the TFT substrate and the counter substrate is reduced. There is also a possibility of the stability of electrical connection between the electrodes 103 and 106 being reduced due to the difference between the amounts of shrinkage of the sealing material and silver paste in the bonding step.

In the second conventional technique, the conductive columns 220 and the electrodes 203 on the TFT substrate 202 are electrically connected only by the pressure applied by means of the seal 205 formed outside the conductive columns 220 to constantly maintain the spacing between the TFT substrate 202 and the counter substrate 204. Therefore, there is a problem that adhesion between the conductive columns 220 and the electrodes 203 on the TFT substrate 202 is so low that the electrical connection is instable. This tendency has become stronger in recent years particularly with the further reduction in thickness of glass substrates used as TFT and counter substrates, because the substrates can be distorted or warped, for example, by an environmental change such as a change in temperature. In extreme cases, the contact portions are disconnected or separated from each other.

In the third conventional technique, the structure on the periphery of the conductive columns 320 in high-precision liquid crystal displays having smaller pixels and a smaller pixel spacing is complicated, resulting in an increase in the number of steps in the manufacturing process and an increase in the manufacturing cost. For establishment of electrical connection between the accumulating capacitor lines 325 and conductive columns 320, troublesome operations are required such as forming holes in gate insulating film 326 on the accumulating capacitor lines 325 and shaving off through the holes the alignment film (not shown) on the accumulating capacitor lines 325 at the bottoms of the conductive columns in order to establish connection between the accumulating capacitor lines 325 and the conductive columns 320. In addition, the conduction between the accumulating capacitor lines 325 and the conductive columns 320 is instable. Further, since the conductive columns 320 on which the counter electrode 306 are formed exist in the display region, rubbing is difficult to perform and the alignment of the liquid crystal material in the vicinity of the conductive columns 320 is disturbed, resulting in a considerable reduction in display quality.

SUMMARY OF THE INVENTION

An object of the present invention is to provide a liquid crystal display having improved reliability and electrically connecting a TFT substrate and a counter substrate with stability, and a method of manufacturing the liquid crystal display.

According to a first embodiment of the present invention, a liquid crystal display comprises a first substrate, a second substrate, and a liquid crystal retained between the first substrate and the second substrate. The liquid crystal display also comprises at least one first conductive column formed on the first substrate, at least one conductive column contact portion electrically connected the conductive column and formed above the second substrate, and a seal bonding the first substrate and the second substrate by contacting at least one part of the first conductive column except at a part of the first conductive column which connects the conductive column contact portion.

According to a second embodiment of the present invention, a method for manufacturing a liquid crystal display comprises providing a first substrate, forming at least one first conductive column on the first substrate, providing a second substrate, forming at least one conductive column contact portion, and forming a seal bonding the first substrate and the second substrate. The seal is cured while adhering to a part of the first conductive column other than a part which contacts with the conductive column contact portion while the first conductive column of the first substrate is maintained in contact with the conductive column contact portion of the second substrate.

BRIEF DESCRIPTION OF THE DRAWINGS

FIG. 1(*a*) is a plan view of the first conventional art and (*b*) is a cross-sectional view of the first conventional art.

FIG. 6(*a*) is a plan view of the liquid crystal display according to the first embodiment of the present invention, and (*b*) is a cross-sectional view of the first embodiment of the present invention.

FIGS. 7(*a*) to (*d*) are cross-sectional views of manufacturing process of the conductive columns shown in FIG. 6.

FIGS. 9(*a*) to (*c*) are perspective views of the conductive column shown in FIG. 6.

FIG. 12(*a*) is a plan view of a liquid crystal display according to a fourth embodiment of the present invention, and (*b*) is a cross-sectional view of a liquid crystal display according to a fourth embodiment of the present invention.

FIG. 13(*a*) is a cross-sectional view of a liquid crystal display according to a fifth embodiment of the present invention, and (*b*) is a perspective view of a liquid crystal display according to a fifth embodiment of the present invention.

FIGS. 14(*a*) to (*e*) are cross-sectional views of a process of manufacturing the conductive columns shown in FIG. 13.

DETAILED DESCRIPTION OF THE INVENTION

First Embodiment

Figure 5:
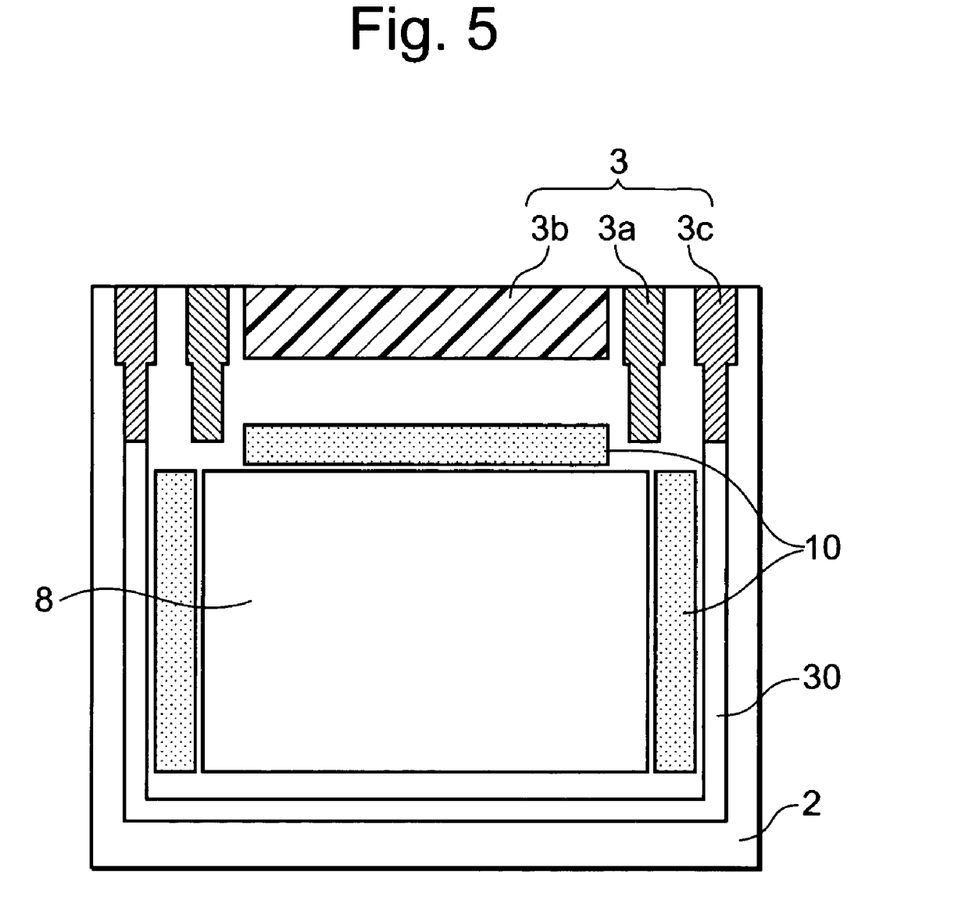
FIG. 5 is a plan view of a TFT substrate of a liquid crystal display according to a first embodiment of the present invention.

FIG. 5 is a plan view of a TFT substrate of a liquid crystal display according to a first embodiment of the present invention. The TFT substrate 2 has a display area 8 and an input terminal portion 3 for connection to an external signal circuit (not shown). The display area 8 has pixel electrodes for applying voltages to a liquid crystal material, switching devices such as TFTs (thin film transistors) for supplying signals to the pixel electrodes, a plurality of scanning lines and a plurality of signal lines which are used for selection and drive of the switching devices and which intersect with each other, accumulating capacitors each of which has a portion of the pixel electrode as its one electrode and in which charges induced by external signals are accumulated, and accumulating capacitor lines connecting the other terminals of the accumulating capacitors. The input terminal portion 3 has COM terminals 3a for inputting a potential to be applied to a counter electrode formed on a counter substrate, circuit drive terminals 3b for inputting signals for driving the switching devices in the display area 8, and an accumulating capacitor line terminal 3c for inputting a potential to be supplied to the accumulating capacitor lines.

The accumulating capacitor line terminal 3c and the accumulating capacitor lines are electrically connected by lead wiring 30. Circuit wiring regions 10 exist around the display area. The circuit wiring region 10 are formed a gate driver and a data driver for driving the switching devices by inputting external signals from the circuit drive terminals 3b, and wiring for electrically connecting these drivers.

Figure 6A:
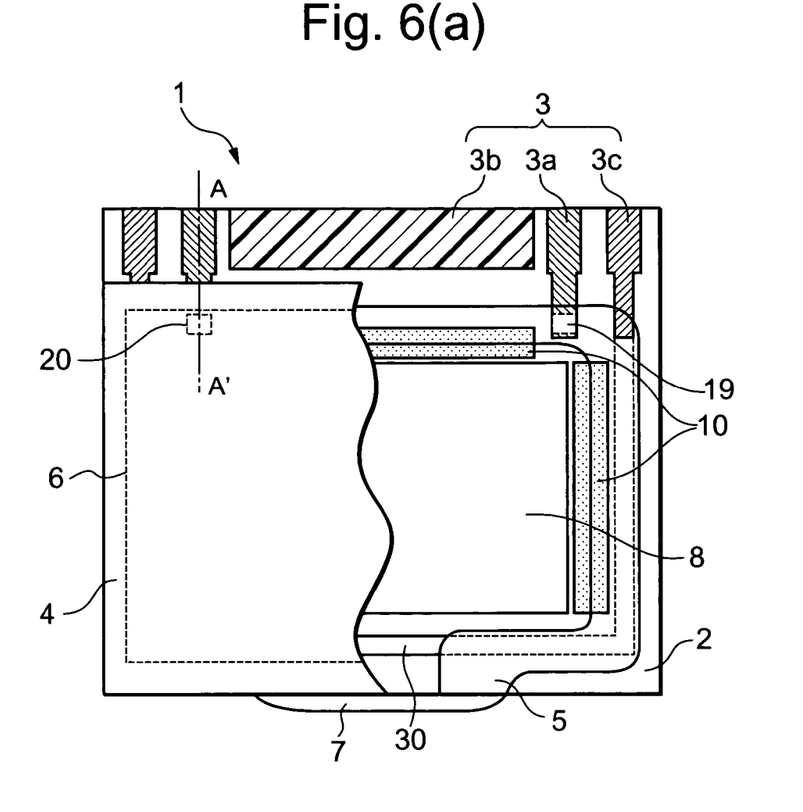
Figure 6B:
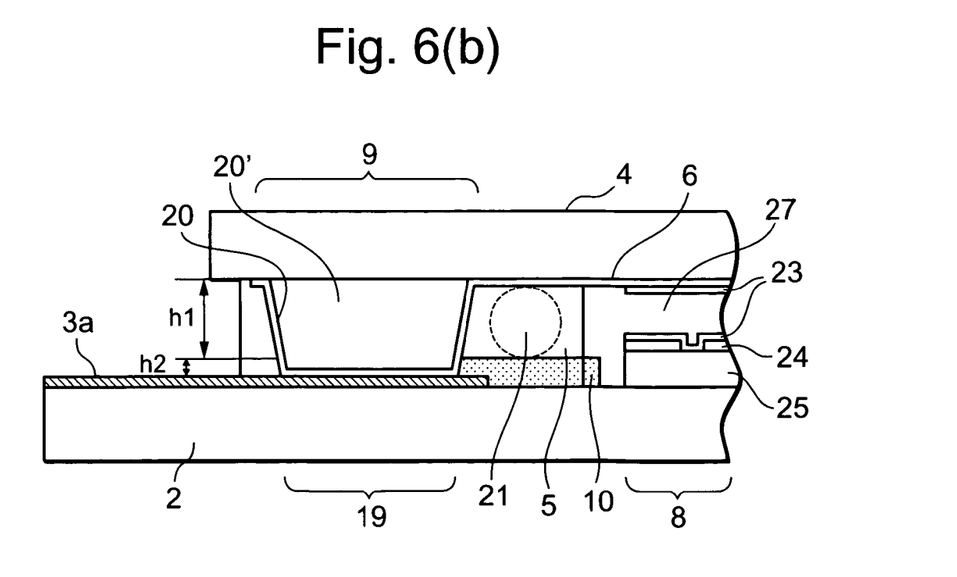

FIG. 6(a) is a partial plan view of a liquid crystal display according to this embodiment, and FIG. 6(b) is a cross-sectional view of FIG. 6(a). The liquid crystal display 1 shown in FIG. 6 is manufactured by using the TFT substrate 2 shown in FIG. 5. In FIG. 6, the portions corresponding or identical to those shown in FIG. 5 are indicated by the same reference characters, and the same description for them will not be repeated. The liquid crystal display 1 has a TFT substrate 2 and a counter substrate 4 opposed to each other. The TFT substrate 2 and the counter substrate 4 are sealed with a seal 5, with a liquid crystal material 27 retained therebetween. The counter substrate 4 has a counter electrode 6 formed so as to face the display area 8, and conductive columns 20. The seal 5 is formed in a state of being fixed to the conductive columns 20. An opening is formed in a portion of the seal 5. After injecting a liquid crystal through the opening, a hole-closing material is applied to and set on the opening to form a hole-closing portion 7.

The COM terminals 3a extend to a region inside the seal 5 on the TFT substrate 2. In the display area 8 are further formed an array portion 25 having scanning lines, signal lines, switching devices such as TFTs, accumulating capacitors, accumulating capacitor lines, etc., electrically connected to the gate driver and the data driver in the circuit layout regions 10, and pixel electrodes 24 electrically connected to the switching devices. In conductive column installation regions 9 where conductive columns of the counter substrate 4 are formed, a ground column 20' formed of an elastic resin material and having a predetermined height exist. The counter electrode 6 of the counter substrate 4 formed so as to face the display area 8 of the TFT substrate 2 extends so as to cover the ground column 20'. The ground column 20' and the portions of the counter electrode 6 covering the ground column 20' form the conductive column 20. The conductive column 20 is formed so as to contact the COM terminals 3a on the TFT substrate 2 so as to be electrically connected to the COM terminals 3a. That is, conductive column contact portions 19 which contact the conductive columns 20 form part of the COM terminals 3a. Further, alignment film 23 is formed on the pixel electrodes in the display area of the TFT substrate 2 and on the counter electrode 6 facing the pixel electrodes.

In the seal 5, spherical spacers 21 having a predetermined diameter are mixed in a sealing material to maintain a predetermined spacing h1 (=the diameter of spherical spacers 21+the thickness of the counter electrode) between the circuit wiring regions 10 of the TFT substrate 2 and the major surface of the counter substrate 4. The conductive columns 20 may be formed to a height corresponding to a value determined by adding a certain margin for ensuring electrical connection between the conductive columns 20 and the COM terminals 3a to the sum of the predetermined spacing (the diameter of spherical spacers 21+the thickness of the counter electrode) h1 and a height difference h2 between the circuit layout regions 10 and the height of the COM terminals 3a from the major surface of the TFT substrate.

FIGS. 7(a) to (d) are cross-sectional views in order of manufacturing process steps for explaining the method of manufacturing the conductive columns 20 shown in FIG. 6. First, a resin layer 20'A formed of a negative photosensitive resin and having a predetermined thickness is formed on the major surface of the counter substrate 4 by spin coating ((a)). Next, a photomask 52 patterned so that resin columns used as cores of conductive columns are formed only at predetermined positions is placed above the resin layer 20'A, and the resin layer 20'A is exposed ((b)).

Figure 7A:
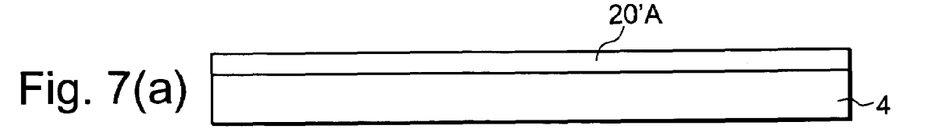
Figure 7B:
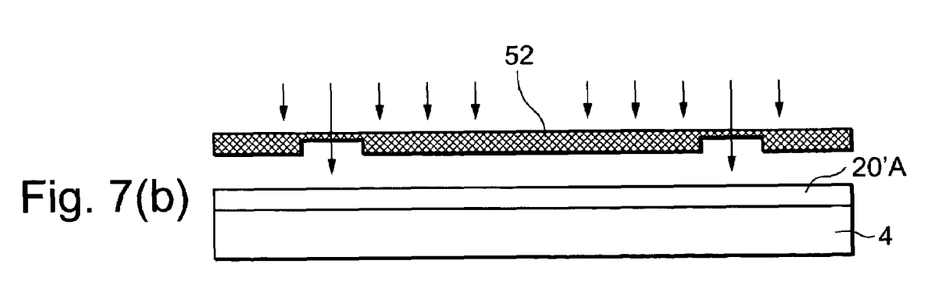
Figure 7C:
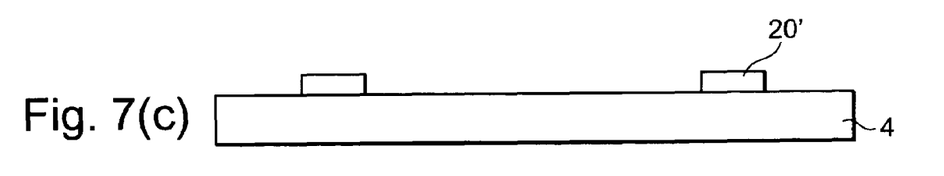
Figure 7D:
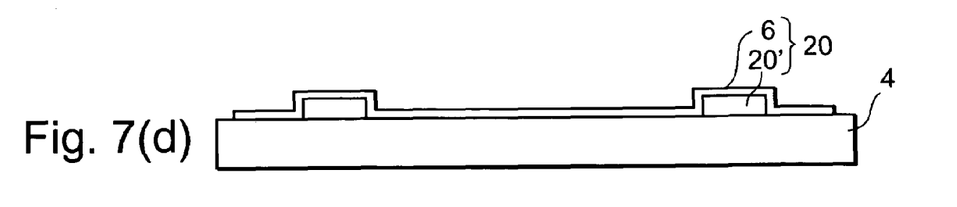

Subsequently, development by an organic solution such as an alkali developer is performed on the exposed resin layer 20'A to form ground columns 20' at the predetermined positions ((c)). Thereafter, generally over the entire surface of the counter substrate 4 on which the ground columns 20' are formed, a film such as ITO film or the like for a transparent electrode is formed by sputtering so as to cover the ground columns 20' and is patterned into a predetermined configuration to form the counter electrode 6, thereby completing the process of manufacturing the conductive columns on the counter substrate 4 ((d)).

The ground columns 20' and the portions of the counter electrode 6 covering the ground columns 20' form conductive columns 20. The height of the conductive columns 20 (the sum of the height of the resin columns 20' and the thickness of the counter electrode 6) is substantially equal to a value determined by adding a certain margin to the sum of the diameter of spherical spacers 21, the thickness of the counter electrode, and h2, as described above. The conductive columns 20 have elasticity since the photosensitive resin is used as the material of their cores. The conductive columns 20 may have the shape of a truncated pyramid, a frustum or the like, i.e., such a shape that it is reduced in width at a position remote from the surface of the counter substrate 4. If the conductive columns 20 have such a shape, the degree of uniformity with which the counter electrode film is formed on the ground columns 20' is improved. Such a shape can be obtained in such a manner that, for example, the transmittance of a peripheral portion of the light transmitting region of the photomask 52 is reduced with the increase in distance from the center of the light transmitting region, and the exposure time is controlled. In the above-described process, the counter electrode 6 is also formed on the portion facing the display area 8 of the TFT substrate 2 when the counter substrate 4 and the TFT substrate 2 shown in FIG. 5 are bonded together.

A manufacturing method for manufacturing the liquid crystal display shown in FIG. 6 after forming the conductive columns on the counter substrate as described above will next be described.

Figure 8:
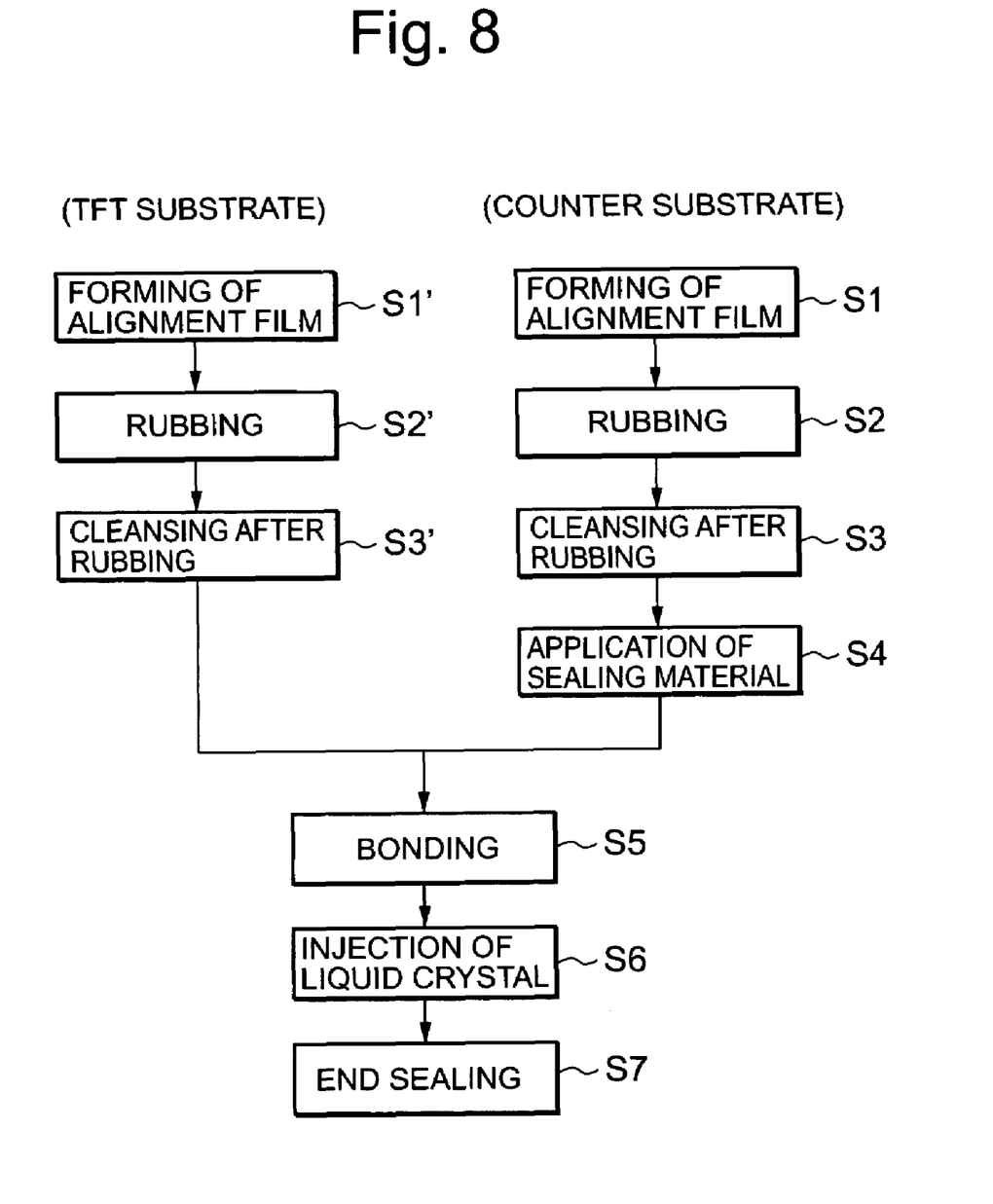
FIG. 8 is a flowchart of the method of manufacturing the liquid crystal display shown in FIG. 6.

FIG. 8 is a flowchart for explaining the method of manufacturing the liquid crystal display shown in FIG. 6. First, alignment film is formed by printing on the pixel electrodes in the display area of the TFT substrate and on the counter electrode on the portion of the counter substrate facing the display area of the TFT substrate (step S1', step S1). Rubbing on the alignment film is performed (step S2', step S2), and cleansing after rubbing is performed (step S3', step S3). Next, a sealing material is applied to the counter substrate so as to completely cover side surfaces of the conductive columns on the counter substrate and to surround the display area of the TFT substrate when the counter substrate and the TFT substrate are bonded together (step S4). A discontinuity for injection of a liquid crystal is formed in the sealing material. As the sealing material, a material of any setting type, e.g., a thermosetting material or ultraviolet curing material may be used. In addition, spherical spacers of a predetermined diameter may be mixed in the sealing material. Next, the TFT substrate and the counter substrate are superposed on each other so that the sealing material on the counter substrate surrounds the display area of the TFT substrate, followed by setting of the sealing material. A seal is thereby formed to bond the two substrates together (step S5). The discontinuity of the sealing material forms an injection hole used in the next liquid crystal injection step.

When the sealing material is set, it shrinks in a state of being maintained in contact with the conductive columns and the COM terminals. Therefore, the seal formed by setting of the sealing material has a force applied between the TFT substrate and the counter substrate to reduce the distance between these substrates. On the other hand, the spherical spacers in the sealing material have the function of maintaining the spacing between the major surface of the counter substrate on the liquid crystal side and the upper surfaces of the COM terminals at h1 (=the diameter of the spherical spacers+the thickness of the counter electrode film) +h2. Thus, the height of the conductive columns can be set to a value determined by adding a margin to (the diameter of the spherical spacers+the thickness of the counter electrode film+h2) to ensure stable contact between the surfaces of the conductive columns on the counter electrode side and the upper surfaces of the COM terminals in a surface contact manner. Further, the resin columns having elasticity are used as the core of the conductive columns to reduce excessive stress caused by the seal in the conductive columns, the COM electrodes, the TFT substrate, the counter substrate, etc., and to ensure that the spacing between the counter substrate surface and the upper surfaces of the COM terminals can be maintained at h1 (=the diameter of the spherical spacers+the thickness of the counter electrode film) +h2 even in the conductive column installation region 9 without causing any considerable stress in the TFT substrate, the counter substrate, etc. Further, since the conductive columns and the COM terminals are maintained in contact with each other when the sealing material sets and shrinks, they do not act so as to damage the other.

Subsequently, a liquid crystal is injected through the injection hole (step S6), and a hole-closing adhesive is applied to and set on the injection hole to form a hole-closing portion (step S7). The manufacturing process in this embodiment is thus completed to obtain the liquid crystal display 1 shown in FIG. 5.

In this embodiment, as described above, the sealing material adhered to the conductive columns and the COM terminals cures and shrinks while the conductive columns and the COM terminals are maintained in contact with each other, thereby realizing stable electrical connection between the conductive columns and the COM terminals. In addition, since a resin having elasticity is used as the material of the cores of the conductive columns, excessive stress due to shrinkage of the sealing material is reduced and a constant spacing is maintained between the TFT substrate and the counter substrate. Therefore, the electrical and physical connection between the conductive columns and the COM terminals can be mentioned to cut even when stress in the substrates, a warp of the substrates, or the like occurs due to an impact externally applied or an environmental change such as a change in temperature. Further, advantageously, an influence of corrosion or the like due to some cause, e.g., water from the outside, can be reduced. In particular, since the resin columns forming the cores of the conductive columns can be formed by using a photosensitive resin, it can be formed simultaneously with the step of patterning for wiring or the like. Therefore, cost and manufacturing time due to the formation of the columns are not increased. Conversely, the arrangement is particularly advantageous in the case of multiple patterning for forming a plurality of small liquid crystal displays on a large substrate, because a plurality of conductive columns can be formed at a time without requiring troublesome operations for forming conductive columns by dotting silver paste by a dispenser method as in the conventional art.

Further, since the conductive columns are formed outside the display area, the conductive columns are not covered with the alignment film at their tops and the conductive columns can be brought into direct contact with the COM terminals, so that a voltage drop due to the alignment film can be avoided. Also, even if a foreign material or the like attached to a rubbing cloth is attached as a contaminant to the conductive columns at the time of rubbing, the foreign material flowing into the liquid crystal layer to contaminate the liquid crystal material can be avoided since the conductive columns are covered with the seal.

Figure 9A:
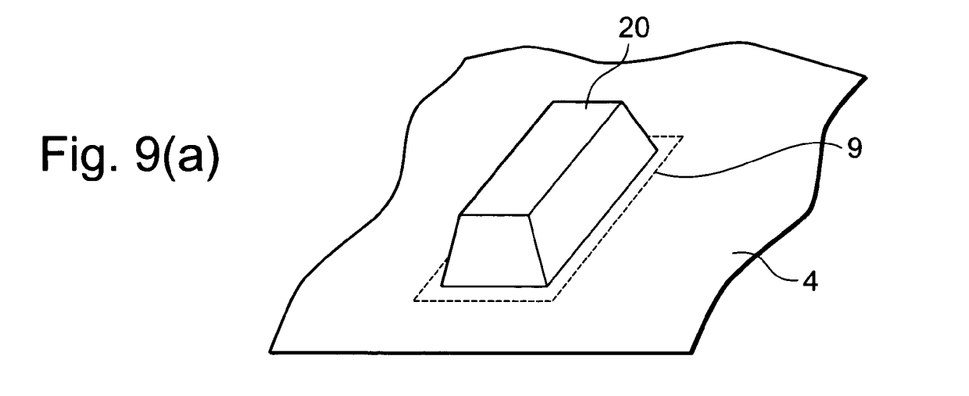
Figure 9B:
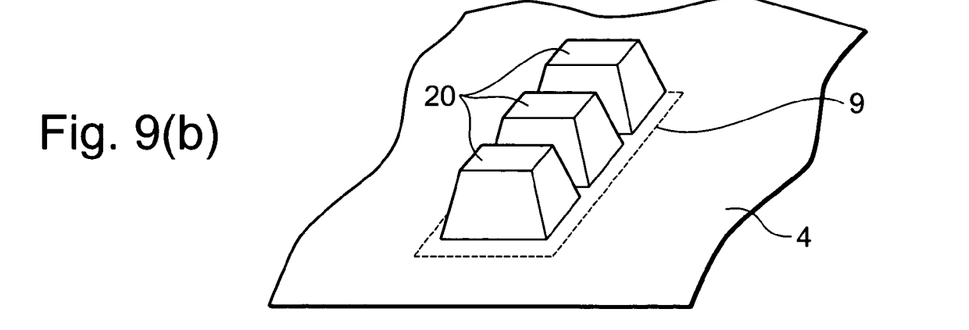
Figure 9C:
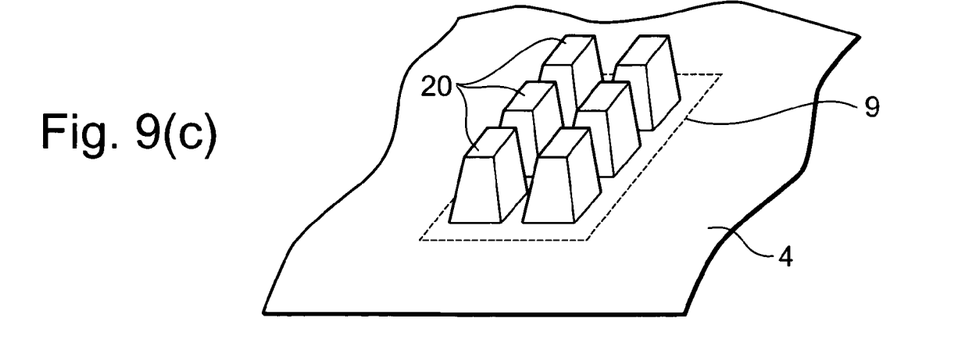

While in the liquid crystal display shown in FIG. 6 one conductive column 20 in the form of a truncated pyramid is formed on one conductive column installation region 9 as shown in FIG. 9(a), a plurality of conductive columns 20 may be formed, for example, as shown in FIG. 9(b) or 9(c). In a case where a plurality of conductive columns 20 are formed in one conductive column installation region 9, the conductive columns 20 contact the conductive column contact portion of the COM terminal at a plurality of points and, therefore, a potential can be supplied to the counter electrode formed on the counter substrate with improved stability in comparison with one-point electrical connection.

The number of conductive column installation regions is not limited to two; it may be one or three or more. Further, the conductive columns 20 may be covered with a low-resistance conductive material such as Cr or Al. Also, such a low-resistance conductive material may be formed so as to surround the periphery of the counter electrode 6 formed of a transparent electrode such as ITO to further stabilize the potential of the counter electrode 6.

Second Embodiment

Figure 10:
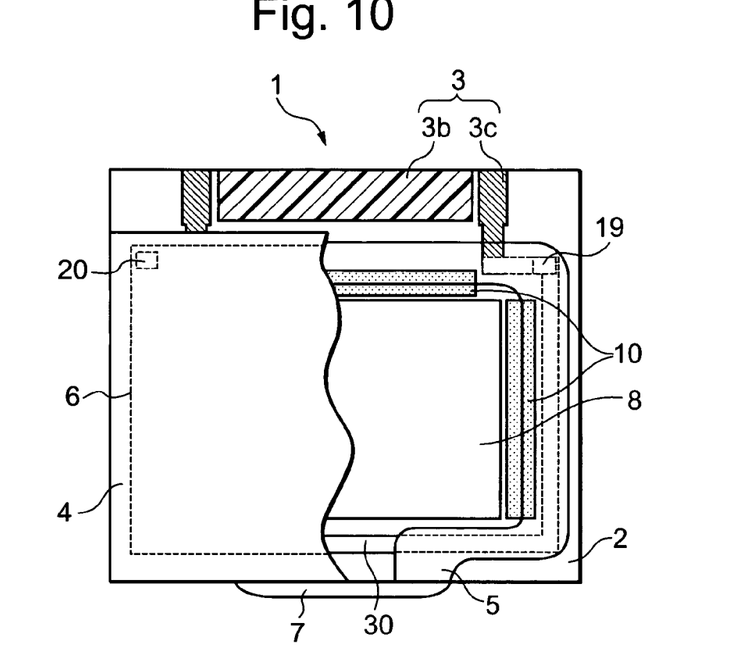
FIG. 10 is a plan view of a liquid crystal display according to a second embodiment of the present invention.

FIG. 10 is a partial plan view of a liquid crystal display according to a second embodiment of the present invention. In FIG. 10, portions corresponding or identical to those shown in FIG. 6(a) are indicated by the same reference characters. The same description for them will not be repeated. This embodiment differs from the first embodiment in that no COM terminal exists in the input terminal portion, and that conductive columns 20 formed on the counter substrate are electrically connected to lead wiring 30 which connects accumulating capacitor line terminals 3c and accumulating capacitor lines in the display area.

Each of accumulating capacitors in the display area is for accumulating an external signal in the form of charge during one-frame period by using as its one terminal a portion of the pixel electrode. The potential of accumulating capacitor lines formed so as to connect the other terminals of the accumulating capacitors can be set to a value freely selected. In this embodiment, therefore, the potential of the accumulating capacitor lines is set equal to the potential of the counter electrode on the counter substrate, thus enabling the conductive columns 20 to be electrically connected to the lead wiring 30 while eliminating the need for the COM terminals 3a in the first embodiment shown in FIG. 6(a).

This embodiment has the same effects as those of the first embodiment. The conductive columns 20 may be connected to the accumulating capacitor line terminals 3c instead of being connected to the lead wiring 30.

Third Embodiment

Figure 11:
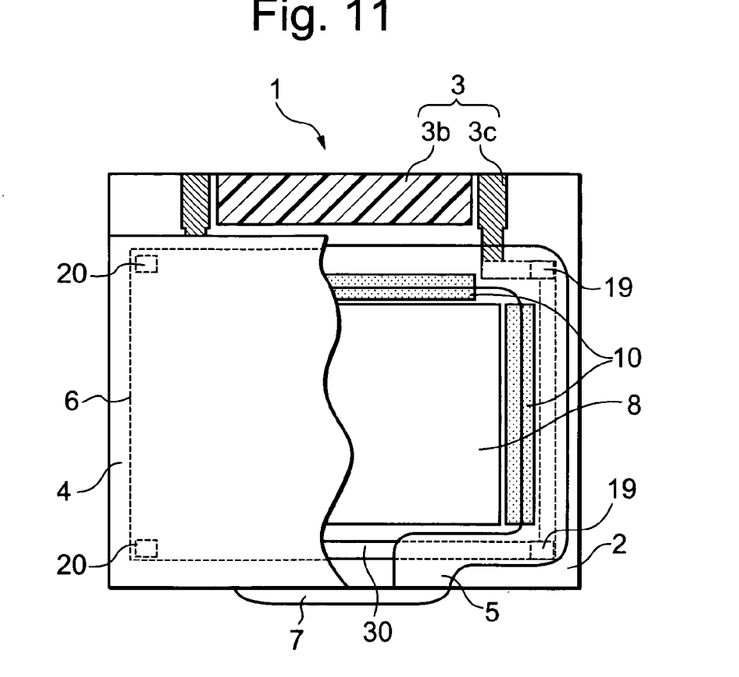
FIG. 11 is a plan view of a liquid crystal display according to a third embodiment of the present invention.

FIG. 11 is a partial plan view of a liquid crystal display according to a third embodiment of the present invention. In FIG. 11, portions corresponding or identical to those shown in FIG. 10 are indicated by the same reference characters. The same description for them will not be repeated. This embodiment differs from the second embodiment shown in that conductive columns 20 formed on the counter substrate are connected to lead wiring 30 on the TFT substrate at four corners of the same.

Conductive columns 20 connected to lead wiring 30 on the TFT substrate at four corners of the same to achieve the effect of uniformly applying a constant potential to the entire surface of the counter electrode 6. The conductive columns 20 may be connected to lead wiring 30 on the TFT substrate at some positions other than the four corners, and may be connected in different places other than the four corners if the same effects can be achieved. This embodiment has the same effects as those of the second embodiment.

Fourth Embodiment

Figure 12A:
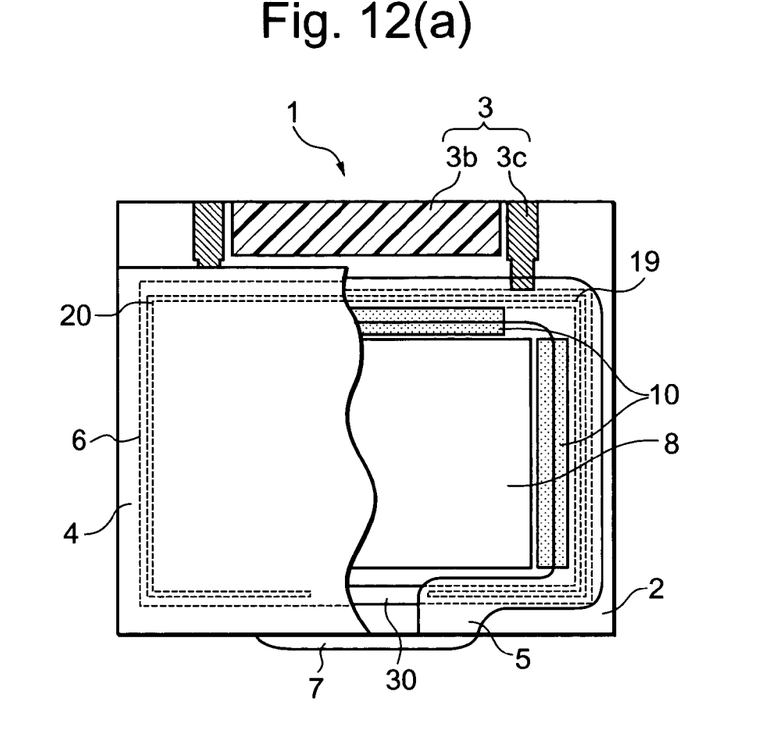
Figure 12B:
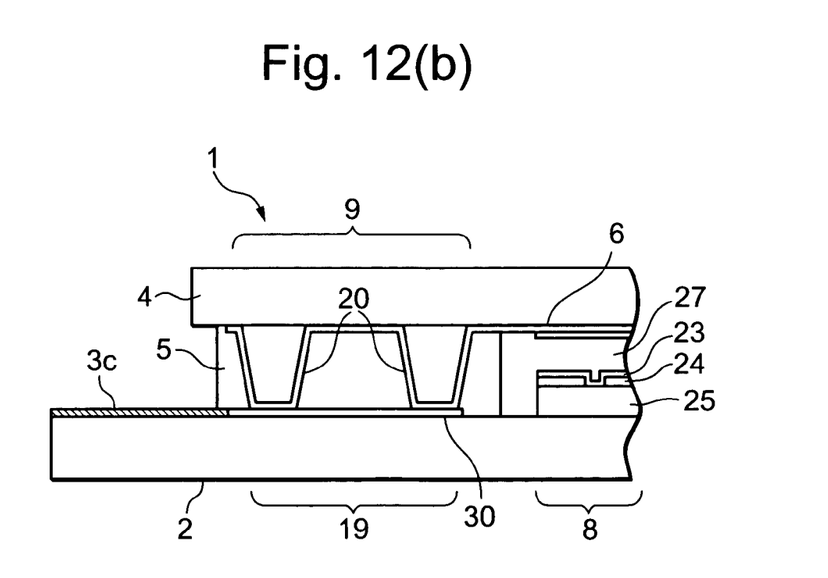

FIG. 12(a) is a partial plan view of a liquid crystal display according to a fourth embodiment of the present invention, and FIG. 12(b) is a cross-sectional view of FIG. 12(a). In FIG. 12, portions corresponding or identical to those shown in FIG. 11 are indicated by the same reference characters. The same description for them will not be repeated. This embodiment differs from the third embodiment in that conductive columns 20 generally completely surround the region of the counter substrate facing the display area 8 of the TFT substrate except at a liquid crystal injection hole, face lead wiring 30 on the TFT substrate, and contact almost the entire surface of the lead wiring 30 on the TFT substrate.

A lead wiring 30 is formed so as to surround the display area 8 of the TFT substrate 2 and to connect accumulating capacitor line terminals 3c and accumulating capacitor lines in the display area 8. Portions of the counter electrode 6 on the conductive columns 20 formed on the counter substrate 4 contact the entire surface of the lead wiring 30 except at the liquid crystal injection hole. The conductive columns 20 are formed to a predetermined height and have the function of constantly maintaining the spacing between the TFT substrate 2 and the counter substrate 4. In the liquid crystal display shown in FIG. 12, therefore, it is possible to maintain the spacing between the TFT substrate 2 and the counter substrate 4 can be maintained at a predetermined value without mixing spherical spacers in the sealing material. Consequently, the manufacturing process can be shortened and the yield rate can be improved.

In this embodiment, the liquid crystal display can be manufactured by the same manufacturing process as that according to the first embodiment shown in the flowchart of FIG. 8. In this embodiment, if at the time of bonding of the TFT substrate and the counter substrate the sealing material is set in a state where the conductive columns 20 and the lead wiring 30 are in contact with each other, the contact between the conductive columns 20 and the lead wiring 30 is made firmer by shrinkage of the sealing material. If the cores of the conductive columns 20 are formed of an elastic resin, excessive stress can be absorbed.

The conductive columns 20 can be manufactured by the same manufacturing method as that according to the first embodiment shown in FIG. 7. While FIG. 12(b) shows a case where two separate conductive columns 20 are concentrically formed, only one conductive column 20 or three or more separate conductive columns 20 may be provided. It is not necessary required that each conductive column 20 integrally surround the display area 8. Each conductive column 20 may be divided into a plurality of pieces formed around the display area 8. This embodiment has the same effects as those of the first to third embodiments.

Fifth Embodiment

Figure 13A:
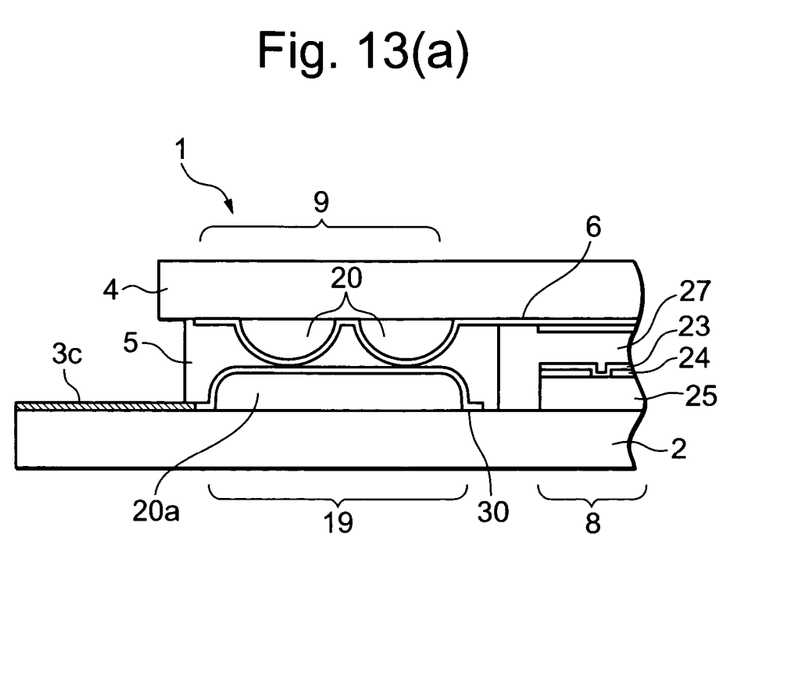
Figure 13B:
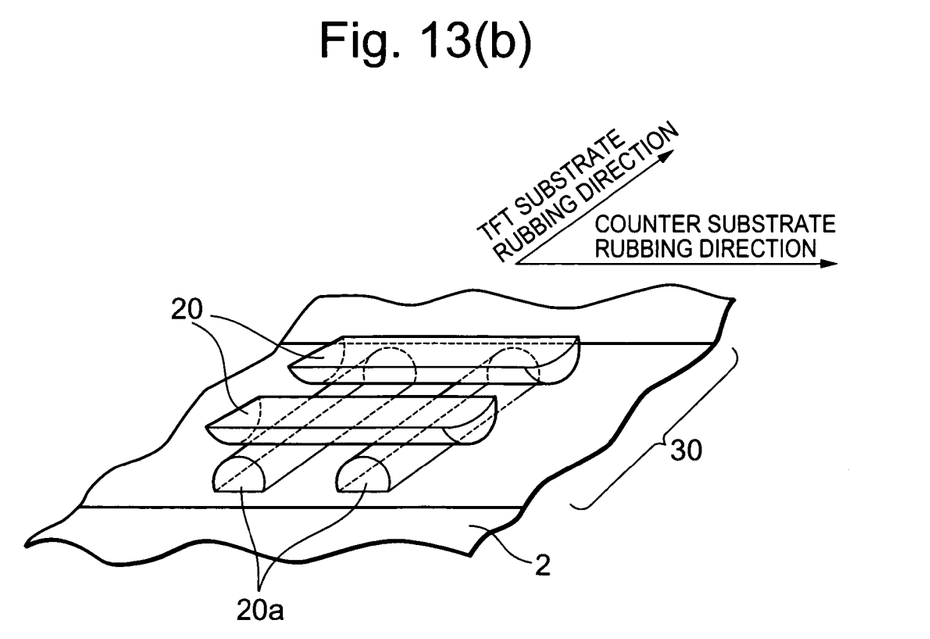

FIG. 13(a) is a sectional view of a liquid crystal display according to an embodiment of the present invention, and FIG. 13(b) is perspective view for explaining the state of contact between conductive columns on a counter substrate and lead wiring on a TFT substrate. In FIG. 13, portions corresponding or identical to those shown in FIG. 12 are indicated by the same reference characters. The same description for them will not be repeated. This embodiment differs from the fourth embodiment in that the circumference of a cross section of conductive columns 20 on the counter substrate 4 perpendicular to the lengthwise direction along the surface of the counter substrate 4 has an arched shape of a finite curvature at least at an extreme end remotest from the surface of the counter substrate 4, and that similar conductive columns 20a are also formed on lead wiring 30 on the TFT substrate 2.

The resin columns forming the core portions of the conductive columns are formed into a shape such as that described above to enable the formation of uniform counter electrode film on the resin columns to be improved. Conductive columns 20a having a similar shape are also formed on lead wiring 30 and the conductive columns formed on the two substrates are placed so as to intersect with each other to provide a plurality of points of contact between the conductive columns, thereby stabilizing the electrical connection between accumulating capacitor line terminals 3c on the TFT substrate and the conductive columns 20 on the counter substrate.

The conductive columns may be formed so that the lengthwise direction of the conductive columns 20 on the counter substrate 4 coincides with the direction of rubbing of the alignment film on the counter electrode on the counter substrate 4, and the lengthwise direction of the conductive columns 20a on the TFT substrate 2 coincides with the direction of rubbing of the alignment film on the pixel electrodes on the TFT substrate 2. For example, the liquid crystal display is TN (twisted nematic) cells, the conductive columns 20 on the counter substrate 4 and the conductive columns 20a on the TFT substrate 2 are formed so as to be perpendicular to each other when the two substrates are bonded together. If the lengthwise directions of the conductive columns and the directions of rubbing of the alignment films on the substrates coincide with each other as described above, the amount of small pieces of material scraped off by rubbing performed on the substrates and remaining after rubbing can be limited. Also, even if cloth of a rubbing roll contacts the conductive columns during rubbing, the friction from the conductive columns to the cloth can be reduced to limit the amount of pieces of material scraped off by rubbing and remaining after rubbing.

Figures 14A, 14E:
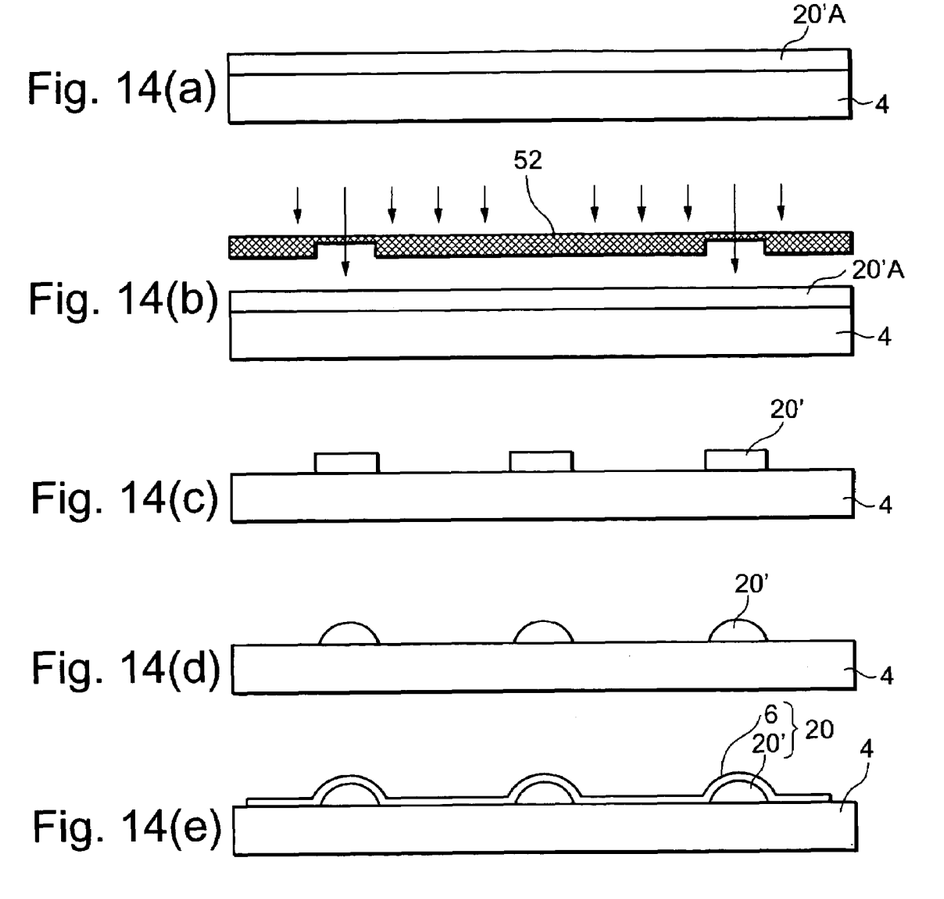

A method of manufacturing conductive columns 20 and 20a will next be described. FIGS. 14(a) to (e) are cross-sectional views in order of manufacturing process steps for explaining the method of manufacturing the conductive columns 20 shown in FIG. 13. The manufacturing process steps shown in (a) to (c) of FIG. 14 are the same as the manufacturing process steps in the first embodiment shown in (a) to (c) of FIG. 7. A photomask 52 used in the process is patterned so that the lengthwise direction of the conductive columns 20 coincides with the direction of rubbing performed on the alignment film formed on the portion corresponding to the display area of the TFT substrate of the counter electrode made in a subsequent step. Subsequently, the temperature of the surface of ground columns 20' is increased to or above the melting temperature to melt the surfaces of the ground columns 20', thereby forming the ground columns 20' having the circumference of its cross section perpendicular to the lengthwise direction along the surface of the counter substrate 4 formed into an arched shape of a finite curvature at least at an end remote from the surface of the counter substrate 4 ((d)). Thereafter, a film for a transparent electrode such as ITO is formed into a predetermined shape by sputtering such as to cover the ground columns 20'. The counter electrode 6 is thereby formed and the process of manufacturing the conductive columns 20 on the counter substrate 4 ends ((e)). The conductive columns may be made so as to have a sectional shape forming part of an ellipse or a circle. Thus, the conductive columns on the counter substrate are formed in correspondence with the direction of rubbing of the alignment film on the counter substrate shown in FIG. 13. Similarly, conductive columns are formed on the TFT substrate in correspondence with the direction of rubbing of the alignment film on the TFT substrate.

The conductive columns formed on the counter substrate and the TFT substrate and intersecting each other may have a different shape, e.g., the shape of a truncated pyramid such as that in the first embodiment shown in FIG. 9. Setting the direction of the longitudinal axes of the conductive columns in correspondence with the direction of rubbing of the alignment film on the substrates is also effective in limiting the amount of small pieces of material scraped off by rubbing and remaining after rubbing in the first to fourth embodiments. This embodiment has the same effects as those of the first to fourth embodiments.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents. For example, the resin columns forming the core portions of the conductive columns may be made not of a negative photosensitive resin but of a positive photosensitive resin. In addition, the lead wiring to the accumulating capacitor lines is not limited to only one conductor. A plurality of conductors may be used as the lead wiring and separately connected to accumulating capacitor line terminals. Further, two or more liquid crystal injection holes may be formed instead of one injection hole. The switching devices for driving the pixel electrodes are also not limited to TFTs. Any other switching devices such as MIM (metal insulator metal) devices or diodes capable of driving the pixel electrodes may alternatively be used.

What is claimed is:

1. A liquid crystal display comprising:
   a first substrate;
   a second substrate;
   a liquid crystal retained between said first substrate and said second substrate;
   at least one first conductive column formed on said first substrate, said first conductive column comprising a ground column made of an elastic resin and a first electrode which covers said ground column;
   at least one conductive column contact portion electrically connected to said first conductive column by direct contact of said first electrode, and formed above said second substrate; and
   a seal which bonds said first substrate and said second substrate by contacting at least one part of said first conductive column except at a part of said first conductive column which connects said conductive column contact portion,
   wherein said at least one first conductive column is surrounded by said seal, and
   wherein said seal shrinks when a sealing material is set.

2. The liquid crystal display according to claim 1, wherein said at least one conductive column contact portion is formed at an input terminal which inputs an external signal, and wherein said input terminal is formed on said second substrate.

3. The liquid crystal display according to claim 1,
   wherein a surface of said second substrate facing said first substrate comprises:
   a display area, wherein said display area comprises a plurality of pixel electrodes modulating a state of said liquid crystal;
   an input terminal which inputs an external signal; and
   a lead wiring extending from at least one of a plurality of accumulating capacitance lines to an outside of said display area and electrically connected to said input terminal,
   wherein said conductive column contact portion is formed in said lead wiring.

4. The liquid crystal display according to claim 1,
   wherein said first conductive column is reduced in width from a surface of said first substrate toward said conductive column contact portion.

5. The liquid crystal display according to claim 1,
   wherein a plurality of said first conductive columns contact said conductive column contact portion.

6. The liquid crystal display according to claim 3,
   wherein a plurality of said first conductive column contact portions contact said lead wiring.

7. The liquid crystal display according to claim 1,
   wherein at least one spacer is formed in said seal.

8. The liquid crystal display according to claim 1,
   wherein a distance between said first substrate and said second substrate is maintained substantially constant.

9. The liquid crystal display according to claim 1,
   wherein a second conductive column is formed on said conductive column contact portion of said second substrate, wherein said second conductive column is connected electrically to said first conductive column.

10. The liquid crystal display according to claim 1, wherein a circumference of said first conductive column from a cross section perpendicular to a surface of said first substrate has an arched shape.

11. The liquid crystal display according to claim 9, wherein a circumference of said second conductive column from a cross section perpendicular to a surface of said first substrate has an arched shape.

12. The liquid crystal display according to claim 9, wherein said second conductive column is connected electrically to said first conductive column at a plurality of locations.

13. The liquid crystal display according to claim 3, wherein a second conductive column is formed on said conductive column contact portion of said second substrate, and wherein said second conductive column is connected electrically to said first conductive column.

14. The liquid crystal display according to claim 13, wherein a lengthwise direction of said first conductive column of said first substrate and a lengthwise direction of said second conductive column of said second substrate coincide with a direction of rubbing of an alignment film formed on said first electrode on said first substrate or each of said first electrode on said first substrate and said pixel electrodes on said second substrate.

15. A liquid crystal display comprising:
a first substrate;
a second substrate;
a liquid crystal retained between said first substrate and said second substrate;
at least one first conductive column formed on said first substrate, said first conductive column comprising a ground column made of an elastic resin and a first electrode which covers said ground column;
at least one conductive column contact portion electrically connected to said first conductive column by direct contact of said first electrode, and formed above said second substrate; and
means for making the electrical connection between said first conductive column and said conductive column contact portion stable, said means contacting with at least one part of said first conductive column,
wherein said at least one first conductive column is surrounded by said means for making the electrical connection between said first conductive column and said conductive column contact portion stable, and
wherein said means for making the electrical connection between said first conductive column and said conductive column contact portion stable shrinks when a sealing material is set.

16. A method for manufacturing a liquid crystal display comprising:
providing a first substrate;
forming a ground column, from an elastic resin, on said first substrate, and covering said ground column with a first electrode so as to form at least one first conductive column;
providing a second substrate;
forming at least one conductive column contact portion on said second substrate, wherein said conductive column portion is electrically connected to said first conductive column by direct contact of said first electrode; and
forming a seal bonding said first substrate and said second substrate,
wherein said seal is cured while adhering to a part of said first conductive column other than a part which contacts said conductive column contact portion, while said first conductive column of said first substrate is maintained in contact with said conductive column contact portion of said second substrate,
wherein said at least one first conductive column is surrounded by said seal, and
wherein said seal shrinks when a sealing material is set.

17. The method for manufacturing a liquid crystal display according to claim 16, further comprising:
forming a display area on said second substrate;
forming a plurality of pixel electrodes modulating a state of said liquid crystal on said second substrate;
forming an input terminal which inputs an external signal on said second substrate; and
forming a lead wiring extending from at least one of a plurality of accumulating capacitance lines to an outside of said display area electrically connected to said input terminal.

18. The method for manufacturing a liquid crystal display according to claim 17, further comprising:
forming a second conductive column on said conductive column contact portion of said second substrate.

19. The method for manufacturing a liquid crystal display according to claim 18, further comprising:
rubbing an alignment film formed on said first electrode or each of said first electrode and said pixel electrodes, in correspondence with a lengthwise direction of said first conductive column or each of said first conductive column and said second conductive column along a surface of said first substrate and said second substrate.

20. The method for manufacturing a liquid crystal display according to claim 16,
wherein said ground column is made of a photosensitive resin.

21. The liquid crystal display according to claim 15, wherein a circumference of said first conductive column from a cross section perpendicular to a surface of said first substrate has an arched shape.

22. The method of manufacturing a liquid crystal display panel according to claim 16, further comprising forming a circumference of said first conductive column, from a cross section perpendicular to a surface of said first substrate, to have an arched shape.

* * * * *